United States Patent
Harrington

(10) Patent No.: US 11,689,281 B2
(45) Date of Patent: Jun. 27, 2023

(54) CELLULAR ENABLED IP RADIO SATELLITE TERMINAL

(71) Applicant: HUGHES NETWORK SYSTEMS, LLC, Germantown, MD (US)

(72) Inventor: Emanuel Harrington, Bowie, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 101 days.

(21) Appl. No.: 17/138,119

(22) Filed: Dec. 30, 2020

(65) Prior Publication Data

US 2022/0209846 A1    Jun. 30, 2022

(51) Int. Cl.
*H04B 7/185* (2006.01)

(52) U.S. Cl.
CPC ......... *H04B 7/1855* (2013.01); *H04B 7/1856* (2013.01); *H04B 7/18528* (2013.01); *H04B 7/18567* (2013.01)

(58) Field of Classification Search
None
See application file for complete search history.

(56) References Cited

U.S. PATENT DOCUMENTS

| 2011/0156951 A1* | 6/2011 | Bhattacharya | G01S 5/015 342/357.31 |
| 2015/0319725 A1* | 11/2015 | Marshall | G04R 40/06 342/450 |
| 2018/0375570 A1* | 12/2018 | Lofquist | H04W 16/28 |

OTHER PUBLICATIONS

Hughes Technologies Networking Platforms, "HT2000L Multipath Terminal: Multiple Options for Path Diverse backup in a single appliance", Captured Dec. 20, 2020, 4 pages.
Ripoll, Bartolome Solera, "Requirements and Design of a Telecommunications Installation in a Vessel," Master's Thesis in Telecommunication Engineering, Centre for Post Graduate Studies, Universitat de les Illes Balears (2020), 122 pages.
International Search Report and Written Opinion dated Apr. 8, 2022 for International Application No. PCT/US2021/065342.

* cited by examiner

*Primary Examiner* — Shripal K Khajuria
(74) *Attorney, Agent, or Firm* — Sheppard, Mullin, Richter & Hampton LLP

(57) ABSTRACT

Some implementations of the disclosure are directed to a satellite and cellular terminal, comprising: an indoor unit; and an outdoor unit comprising a satellite antenna and an outdoor Radio configured to communicatively couple to the indoor unit, the outdoor Radio comprising: an outdoor cellular antenna configured to communicate over a cellular communications network by transmitting signals generated using at least a cellular modem; and a feed horn configured to communicatively couple to the satellite antenna, wherein the satellite antenna is configured to communicate over a satellite communications network by transmitting signals over an inroute and receiving signals over an outroute.

16 Claims, 6 Drawing Sheets

CELLULAR ENABLED IP RADIO SATELLITE TERMINAL

SUMMARY

Implementations of the disclosure are directed to optimizing the cellular communication link for a combined satellite and cellular terminal.

In one embodiment, a terminal comprises: an indoor unit; and an outdoor unit, comprising: a satellite antenna; and an outdoor Radio configured to communicatively couple to the indoor unit, the outdoor Radio comprising: an outdoor cellular antenna configured to communicate over a cellular communications network by transmitting signals generated using at least a cellular modem; and a feed horn configured to communicatively couple to the satellite antenna, wherein the satellite antenna is configured to communicate over a satellite communications network by transmitting signals over an inroute and receiving signals over an outroute. In some implementations, the terminal is a very small aperture terminal (VSAT).

In some implementations, the outdoor Radio is an Internet Protocol (IP) Radio, the IP Radio comprising a satellite modem configured to modulate signals for transmission over the inroute. The IP Radio may further comprises the cellular modem. In some implementations, the indoor unit may comprise: a SIM card slot configured to receive a SIM card. The SIM card when inserted into the SIM card slot, may be configured to communicate with the cellular modem over a communication link that communicatively couples the indoor unit and the IP Radio. In some implementations, the IP Radio further comprises: a SIM card slot configured to receive a SIM card that communicatively couples to the cellular modem.

In some implementations, the indoor unit comprises the cellular modem. In some implementations, the indoor unit further comprises: a SIM card slot configured to receive a SIM card that communicatively couples to the cellular modem.

In some implementations, the indoor unit and the outdoor Radio are configured to communicatively couple via an interfacility link (IFL) cable. The cellular modem may be configured to send and receive intermediate frequency (IF) signals over the IFL cable.

In one embodiment, an outdoor unit for a satellite terminal comprises: a satellite antenna and an outdoor Radio configured to communicatively couple to an indoor unit of the satellite terminal, the outdoor Radio, comprising: an outdoor cellular antenna configured to communicate over a cellular communications network by transmitting signals generated using at least a cellular modem; and a feed horn configured to communicatively couple to the satellite antenna, wherein the satellite antenna is configured to communicate over a satellite communications network by transmitting signals over an inroute and receiving signals over an outroute.

In some implementations, the outdoor Radio is an Internet Protocol (IP) Radio, the IP Radio comprising a satellite modem configured to modulate signals for transmission over the inroute and demodulate signals received over the outroute. In some implementations, the IP Radio further comprises: the cellular modem. In some implementations, the indoor unit comprises a SIM card slot for receiving a SIM card, wherein when the SIM card is inserted into the SIM card slot, the cellular modem is configured to communicate with the SIM card over a communication link that communicatively couples the indoor unit and the outdoor unit. In some implementations, the IP Radio comprises a SIM card slot for receiving a SIM card that communicatively couples to the cellular modem.

In some implementations, the Radio further comprises: an interfacility link (IFL) interface, wherein the IFL interface is configured to receive an IFL cable that couples the outdoor unit to the indoor unit.

In some implementations, the indoor unit comprises the cellular modem, wherein the Radio is configured to receive intermediate frequency (IF) signals transmitted by the cellular modem over the IFL cable.

In one embodiment, an indoor unit for a satellite terminal comprises: a network interface for connecting one or more user devices over a local area network; and a SIM card slot configured to receive a SIM card, wherein the indoor unit is configured to communicatively couple, over an interfacility link (IFL) connecting the indoor unit to an Internet Protocol (IP) Radio of the satellite terminal, the SIM card to a cellular modem of the IP Radio.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
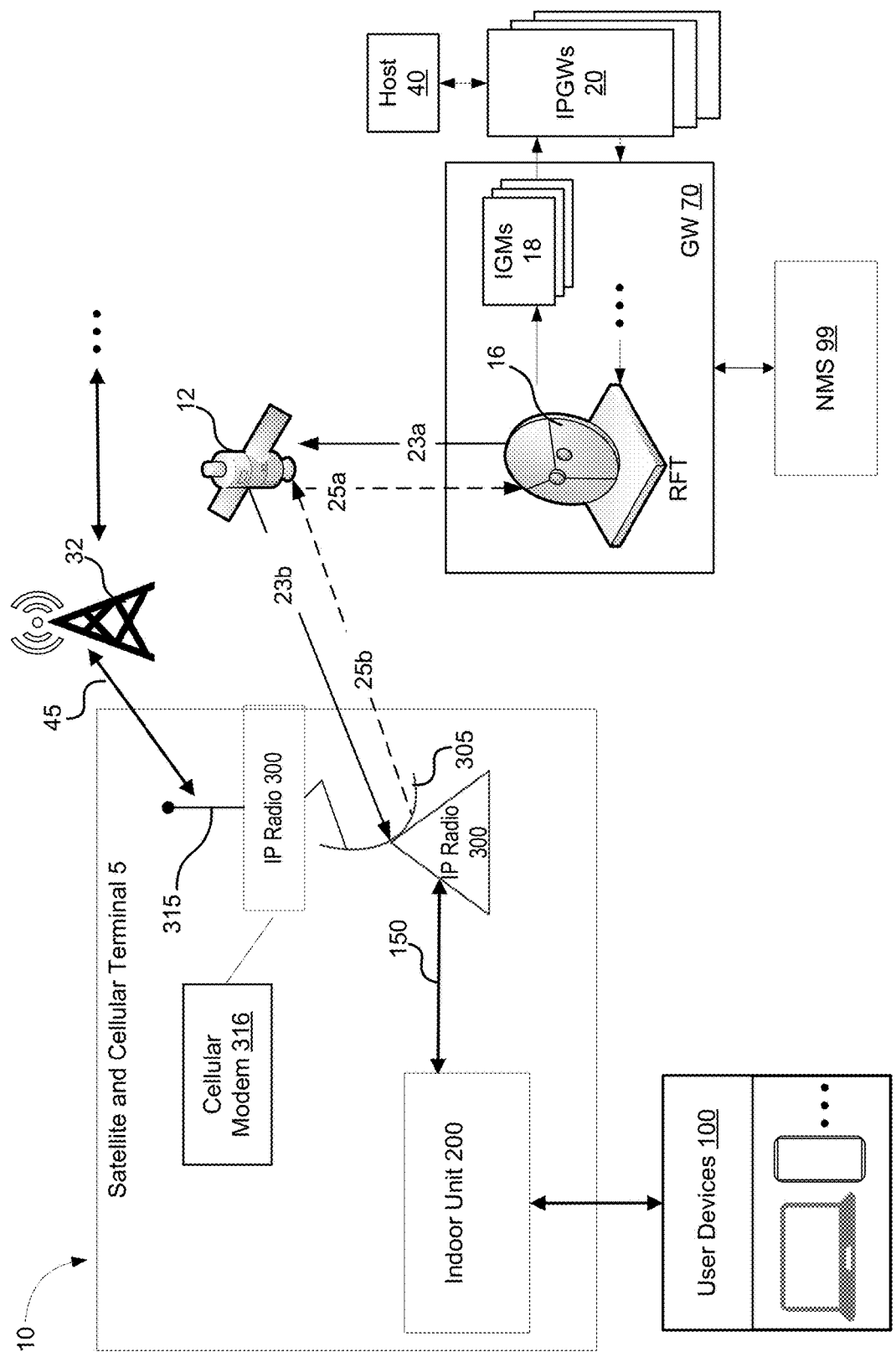
FIG. 1 illustrates an example communications system comprising a satellite and cellular terminal including an indoor unit and an outdoor IP Radio with cellular modem and cellular antenna, in accordance with implementations of the disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In some satellite communication systems, a satellite terminal of a subscribing user includes a satellite indoor unit that communicates with an outdoor Internet Protocol (IP) Radio connected to a satellite antenna. The satellite indoor unit associated with the satellite network subscription may provide access to the satellite network by broadcasting a WIFI network that is accessible by devices in or near the premises of the subscribing user.

Some satellite indoor units also include a cellular router with a chipset and external antenna(s) that provide access to a terrestrial cellular network such as a Long-Term Evolution (LTE) network. Terminals that also provide access to a cellular network may be referred to as a satellite and cellular terminal. Such terminals may be configured to route Internet traffic either over the satellite link or cellular link depending upon the type of traffic, routing criteria, delays, etc.

A disadvantage of such devices is the location of the cellular antenna within the user's premises. Indoor units of terminals are typically installed inside a user residence at the point of interfacility link (IFL) cable entry, which is often in a basement or area without windows. Getting good signal reception within a building may be challenging, especially if the building if far from a cellular tower. The location of the cellular router in the building along with wall and floor material can attenuate the signal to/from the antenna. Another disadvantage with this design is that it may be impractical to find a suitable way to mount the device's bulky, external cellular antenna within a residence. A further disadvantage of this design is that it may place the cellular antenna in proximity to the satellite modem of the indoor unit, which may generate L-band signals that interfere with the cellular antenna. As such there is a need for improving the design of a combined satellite and cellular terminal.

Implementations of the disclosure are directed to optimizing the cellular communication link for a combined satellite and cellular terminal. In accordance with some implementations of the disclosure, the cellular antenna(s) of the satellite and cellular terminal are incorporated with the outdoor IP Radio. By virtue of designing the terminal to locate the cellular antenna outside the premises, signal reception may be improved. As such, the subscribing user may have more options for service providers along with better quality of service. Being outside also provides more options for mounting the cellular antenna(s) to separate from the satellite modem's L-band signal.

In some implementations of the disclosure, a subscriber identity module (SIM) card may be located indoors in the satellite indoor unit while the cellular antenna and cellular modem are located outside with the outdoor IP Radio. To enable communications over the cellular network, a secure link between the SIM card and cellular modem may be established over an IFL between the indoor unit and the outdoor IP Radio. Implementations that retain the SIM card inside the indoor unit provide the additional benefit of providing for ease of insertion for replacement of the SIM card (e.g., when the user changes cellular service providers). The advantages of these and other implementations are further discussed below.

FIG. 1 illustrates an example communications system 10 comprising a satellite and cellular terminal 5 including an indoor unit 200 and outdoor IP Radio 300, in accordance with implementations of the disclosure. Communications system 10 includes both a satellite network and a cellular network. As depicted in this example, communications system 10 includes a cellular tower 32, satellite 12, Gateway Earth Station (GW) 70, one or more IP gateways (IPGWs) 20, and satellite and cellular terminal 5.

Although a single satellite 12 is shown in this example, it should be appreciated that satellite network of communications system 10 may be a multi-satellite network where a particular satellite services a satellite terminal 5 depending on the present location of the satellite terminal 5 and present location of the spotbeam of the satellite. Additionally, although a single cellular tower 32 is shown in this example, it should be appreciated that the terrestrial cellular network of communications system 10 may be have multiple towers where a particular tower services a device (e.g., satellite and cellular terminal 5) depending on the present location of the device and the location of the tower. Further, although a single GW 70 and terminal 5 are depicted in this example, it should be appreciated that communications system 10 may comprise multiple GWs and multiple terminals.

GW 70 may be configured as a high capacity earth station with connectivity to ground telecommunications infrastructure. A network management system (NMS) 99 may be communicatively coupled to GW 70 over a network and direct its operation. NMS 99 may be located remotely from GW 70 or co-located with GW 70. NMS 99 may manage satellite network and subscriber services.

GW 70 includes one or more radio frequency terminals (RFT) 16 that includes the physical equipment responsible for sending and receiving signals to and from satellite 12, and may provide an interface for GW 70. GW 70 may also include one or more inroute group managers (IGMs) 18 that function as bandwidth controllers running bandwidth allocation algorithms. The IGMs 18 may manage bandwidth of terminal 5 and other terminals in the form of inroute groups (IGs), based in part on bandwidth demand requests from the remote terminals.

Feeder links may carry data between RFT 16 and satellite 12, and may include: forward uplink 23a for transmitting data from RFT 16 to satellite 12; and return downlink 25a for transmitting data from satellite 12 to RFT 16. User links may carry data between satellite 12 and terminal 5, and may include: return uplink 25b for transmitting data from terminal 5 to satellite 12; and forward downlinks 23b for transmitting data from satellite 12 to terminal 5. Forward uplink 23a and forward downlink 23b may form an outroute, and return uplink 25b and return downlink 25a may form an inroute. Satellite 12 may transmit satellite signals corresponding to a user spot beam having a coverage area that may be in the geographic region in which terminal 5 and other satellite terminals are located and are able to connect to satellite 12.

Satellite 12 may be any suitable communication satellite. For example, satellite 12 may be a bent-pipe design geostationary satellite, which can accommodate innovations and variations in transmission parameters, operating in the Ka-band, Ku-band or C-band. Satellite 12 may use one or more spot beams as well as frequency and polarization reuse to maximize the total capacity of the satellite network. Signals passing through satellite 12 in the forward direction may be based on the DVB-S2 standard (ETSI EN 302 307) or DVB-S2X standard using signal constellations up to and including at least 256-APSK. The signals intended to pass through the satellite in the return direction from satellite terminals may be based on the Internet Protocol over Satellite (IPoS) standard (ETSI TS 102 354). Other suitable signal types may also be used in either direction, including, for example higher data rate variations of DVB-S2 or DVB-RCS.

IPGWs 20 may include the set of layer 2 and layer 3 packet processing equipment between GW 70 and the Internet. In some implementations, IPGW may be collocated with GW 70. In other implementations, IPGWs 20 may be provisioned at another location. In some implementations, multiple IPGWs may be connected to GW 70. IPGWs 20 may be an ingress portion of a local network. IP traffic, including TCP traffic originating from a host 40 from the internet, may enter GW 70 through IPGWs 20.

Data from an Internet intended for a terminal 5 may be in the form of IP packets, including TCP packets and UDP packets, or any other suitable IP packets. The data may enter GW 70 at any one of IPGWs 20. The IP packets may be processed and multiplexed by GW 70 along with IP packets from other IPGWs, where the IPGWs may or may not have the same service capabilities and relative priorities. The IP packets may be transmitted to satellite 12 on forward uplink 23*a* using the air interface provided by RFT 16. Satellite 12 may then transmit the IP packet to the satellite and cellular terminal 5 using forward downlink 23*b*. Similarly, IP packets may enter the network via terminal 5, be processed by a terminal 5, and transmitted to satellite 12 on return uplink 25*b*. Satellite 12 may then send these inroute IP packets to GW 70 using return downlink 25*a*.

Data to an Internet from a terminal 5 may also be transmitted via a cellular communication link 45 between a cellular tower 32 and terminal 5. The terminal 5 may communicate over the cellular communication link 45 using one or more antennas 315 of outdoor IP radio 300 of terminal 5. Communications over cellular communication link 45 may be in accordance with any cellular network standard supported by the terminal 5 and cellular tower 32, including 3G, 4G, LTE, 5G, etc.

The terminal 5 may be configured as a very-small-aperture terminal (VSAT). In some implementations, the terminal 5 may be a terminal of a subscriber's home or premise. In some implementations, the terminal 5 may be implemented as a community WiFi terminal that may provide service to multiple households or to users visiting a community access site (e.g., a coffee shop).

The terminal 5 connects to the Internet or other network through cellular tower 32 or satellite 12 and IPGWs 20/GW 70, and provides access to the Internet or other network to one or more user devices 100 that connect to satellite terminal 5. Terminal 5 includes an indoor unit 200 communicatively coupled to an IP Radio 300 via IFL 150 (e.g., a coaxial cable link).

Example functions that may be performed by terminal 5 may include, for example, providing IP address and other assignments via the dynamic host configuration protocol (DHCP), and responding to requests for renewal and updates; responding to Address Resolution Protocol (ARP) requests for any IP address on the local subnet; carrying unicast IP (TCP and UDP) packets to the space link via IFL link 150; carrying multicast UDP/IP packets to the space link if enabled; accepting IP packets directed to its local IP address (e.g., for WebUI); and the like.

Figure 2:
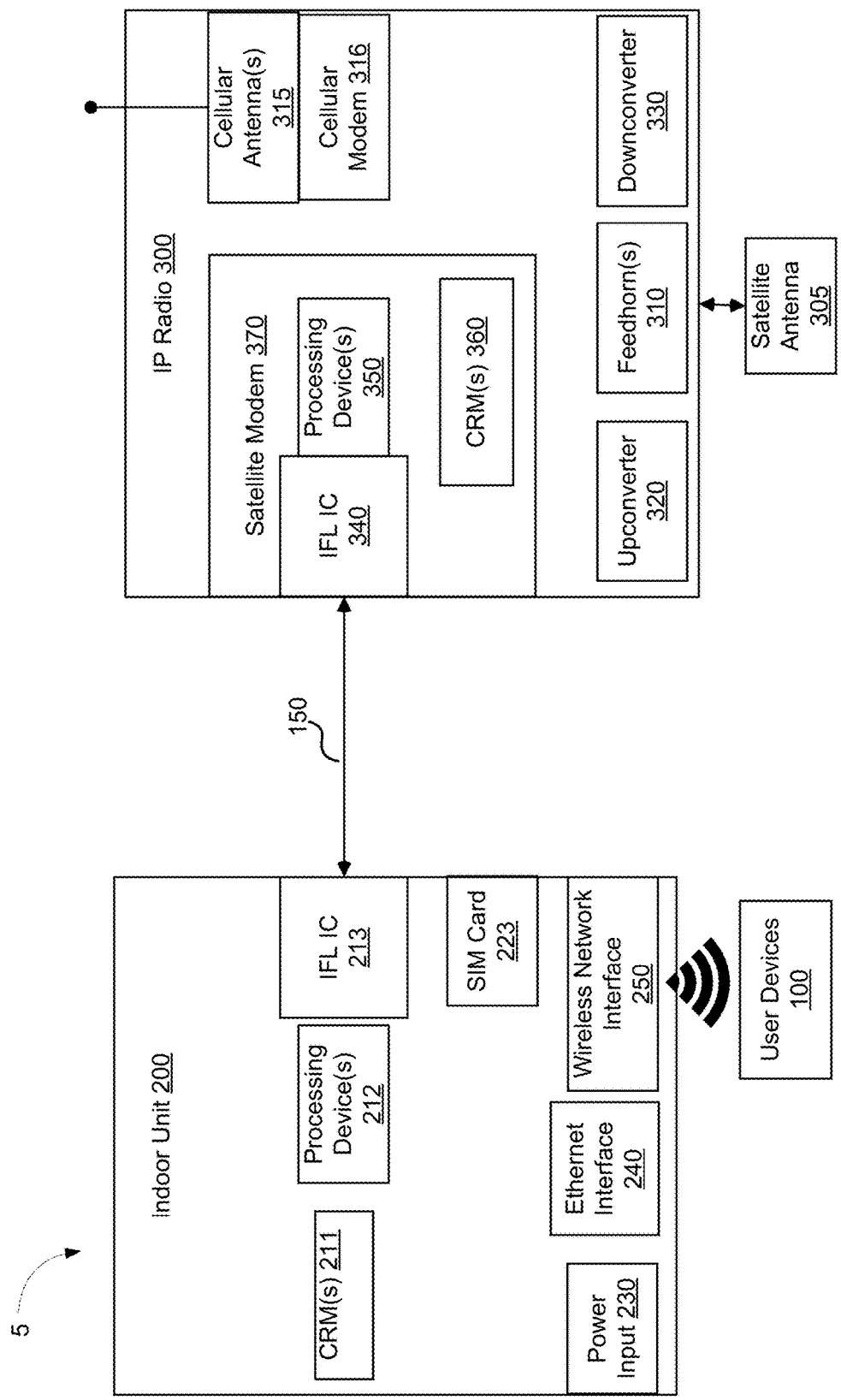
FIG. 2 is a block diagram illustrating some components of the indoor unit and outdoor IP Radio of FIG. 1, in accordance with implementations of the disclosure.

FIG. 2 is a block diagram illustrating some components of indoor unit 200 and IP radio 300 of a satellite and cellular terminal 5, in accordance with implementations of the disclosure. In this implementation, network packets to/from the satellite communications network and cellular communications network of system 10 may respectively flow through satellite modem 370 of IP Radio 300 and cellular modem 316 of IP Radio 300.

As depicted, indoor unit 200 includes one or more computer readable mediums (CRMs) 211, one or more processing devices 212, IFL integrated circuit (213), power input 230 to receive energy to power indoor unit 200 and IP Radio 300, Ethernet interface 240 including one or more ports, wireless network interface 250, and SIM card slot 223.

In the illustrated example, indoor unit 200 functions as WIFI router. It includes a wireless network interface 250 to broadcast a WIFI network that user devices 100 wirelessly connect to. The wireless network interface 250 may provide access to each of satellite modem 370 and cellular modem 316 in IP Radio 300. The one or more user devices 100 may include any user device that is provided access to the Internet or other network by the satellite modem 370 and/or cellular modem 316. For example, the one or more user devices 100 may be a laptop, a desktop computer, a router, a tablet, a smartphone, a smart television, a smart home device, etc. A user device 100 may transmit packets to or receive packets from the modem(s). The user device 100 may wirelessly couple to the indoor unit 200 (e.g., over WIFI) or directly couple to the indoor unit 200 over an ethernet cable that couples to a port of Ethernet interface 240. In alternative implementations, indoor unit 200 does not have an integrated router, and instead functions as a switch that is communicatively coupled to a separate router that may provide WIFI access and/or ethernet ports. In some implementations, indoor unit 200 may include a network adapter with a power supply with integrated MoCA and Ethernet interfaces.

The IFL IC 213 enables communication with IP Radio 300 over IFL 150. For example, the IFL IC 213 may be a Multimedia over Coax Alliance (MoCA) IC that enables communication over a coaxial cable IFL link 150 using the MoCA standard. The MoCA IC may be implemented on a suitable chipset that supports coaxial cable transmissions to/from indoor unit 200 using the MoCA protocol. For example, the chipset may support MoCA 1.0, MoCA 2.0, MoCA 2.5, MoCA 3.0, etc. Example cable types that may be used with the IFL link 150 include RG-6 dual shield, RG-6 quad shield, and RG-11. As another example, the IFL 150 may be an Ethernet cable or fiber optic cable.

Additionally, indoor unit includes a SIM card slot that communicatively couples to a SIM card 223 inserted into the SIM card slot. The SIM card 223 may store network-specific information used to identify and authenticate the user's subscription on the cellular network. For example, the SIM card may be store a unique serial number (ICCID), an international mobile subscriber identity (IMSI) number, an authentication key (Ki), a local area identity (LAI), carrier specific data, and other data required for cellular modem 316 to operate over the cellular network. When inserted into the SIM card slot, the SIM card may communicate with cellular modem 316 over IFL 150 or some other suitable link. Between the indoor unit 200 and IP Radio 300.

As depicted, IP Radio 300 may include one or more cellular antennas 315, a cellular modem 316, one or more feedhorns 310, upconverter 320, downconverter 330, and a satellite modem 370.

The IP Radio 300 may be a component of an outdoor unit of terminal 5 that also includes a satellite antenna 305 coupled to IP Radio 300. Satellite antenna 305 transmits signals to satellite 12 via uplink 25*b* and receives signals from satellite 12 via downlink 23*b*. Satellite antenna 305 may be any suitable antenna design (e.g., small aperture parabolic antenna design) configured to transmit and receive electromagnetic signals to and from one or more satellites.

The satellite modem 370 may include an IFL IC 340, one or more processing devices 350, and one or more CRMs 360. The one or more CRMs 360 of satellite modem 370 may store data associated with satellite network data flows, and instructions that are executable by one more processing devices 350 to control the operation of satellite modem 370. The one or more processing devices 350 of satellite modem 370 may be configured to encode digital traffic information and modulate one or more carrier wave signals with the encoded information for transmission over an uplink 25b. For example, coding and modulation may be performed in accordance with the DVB-S2 standard or some variant thereof. In some implementations, satellite modem 370 also includes an integrated satellite router functionality.

The one or more feed horns 310 may be configured to convey uplink signal 25b and downlink signal 23b to upconverter 320 and downconverter 330, respectively. In implementations where a single feed horn 310 conveys both uplink and downlink signals, IP Radio 300 may also include an orthomode transducer (OMT) attached to the feed horn. In such implementations, the OMT may combine or separate the uplink signal and the downlink signal (e.g., by orthogonally polarizing the uplink signal and downlink signal such that the two signals are at 90° to each other).

Upconverter 320 may be configured to upconvert and amplify signals received from the satellite modem 370. The signal may be frequency upconverted such that it falls within one of the radio spectrum bands identified for satellite communication, such as the $K_u$ band, $K_a$ band, C band, or other suitable radio frequency band. The frequency upconverted (and amplified) signal may be sent via feed horn 320 to the satellite antenna 305, which may focus the signal into a narrow beam for transmission to a satellite. In some implementations, the upconverter 320 may be a block upconverter (BUC).

Downconverter 330 may be configured to receive a downlink signal 23b relayed by satellite antenna 305 through a feed horn 310. The downconverter 330 may combine several different components, such as a low-noise amplifier, local oscillator, and frequency mixer, to convert the downlink signal into a range of intermediate frequencies (IF) for carrying to the satellite modem 370. In some implementations, the downconverter 330 may be a low noise block. In implementations, some or all of feedhorn(s) 310, upconverter 320, and downconverter 330, may be mounted on satellite antenna 305.

The IFL IC 340 enables communication between IP Radio 370 and indoor unit 200 over IFL 150. For example, the IFL IC 340 may be a MoCA IC that enables communication over a coaxial cable IFL link 150 using the MoCA standard.

In this implementation, terminal 5 incorporates one or more cellular antennas 315 and cellular modem 316 with the outdoor IP Radio 300. The terminal 5 may communicate over the cellular communication link 45 using the one or more cellular antennas 315 of IP Radio 300. The one or more cellular antennas 315 may be mounted directly to the IP Radio 300. As the user may be far away from the closest cellular tower 32 for their service provider, having a method to achieve the strongest possible signal may be important. Not being able to reliably communicate with the service provider's cellular tower would prevent the user from being able to benefit from the cellular service and could mean lost revenue for the service provider. With one or more cellular antennas 315 mounted to the IP Radio 300, this may also allow greater distance separation of the cellular antennas from L-band signals of the satellite modem due to wire lengths and/or mounting options. For example, although downconversion may still occur to the L-band in IP Radio 300, the L-band signals may remain internal to the housing of the IP Radio 300 as opposed to traveling via the IFL 150 and interfering with a cellular antenna at the indoor unit. This design may benefit LTE signals and 5G signals. This design may also alleviate the user trying to find a way to mount a bulky cellular antenna design inside their residence.

The one or more cellular antennas 315 may include one or more receive elements and one or more transmit elements. For example, the one or more cellular antennas 315 may be implemented using a multiple-input and multiple-output (MIMO) structure to increase the capacity of the cellular radio link using multiple receiving antennas and transmission antennas.

In some implementations, the one or more cellular antennas 315 of IP Radio 300 may be configured to be mounted on satellite antenna 305. This may further improve signal reception over the cellular network.

Figure 3:
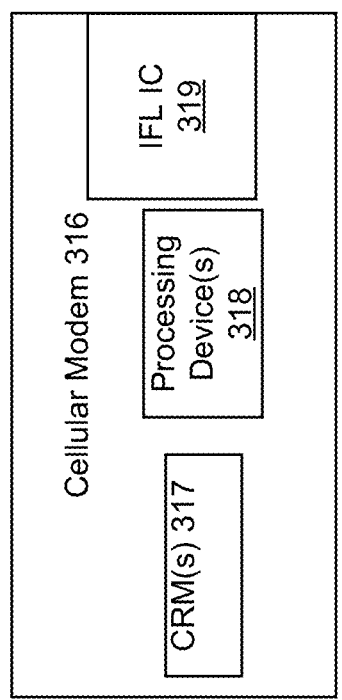
FIG. 3 illustrates example components of the cellular modem of the outdoor IP Radio of FIG. 1.

FIG. 3 illustrates example components of cellular modem 316 of the outdoor IP Radio 300. Cellular modem 316 includes one or more CRMs 317 and one or more processing devices 318. The one or more CRMs 317 may store data associated with cellular network data flows, and instructions that are executable by the one more processing devices 318 to control the operation of cellular modem 316. The one or more processing devices 318 may be configured to encode digital traffic information and modulate one or more carrier wave signals with the encoded information for transmission over cellular communication link 45. For example, coding and modulation may be performed in accordance with the LTE or 5G standard. The signals may be provided to cellular antenna(s) 315 of IP Radio 300. The one or more processing devices 318 may also be configured to demodulate signals to decode information received via cellular antenna(s) 315. In some implementations, the cellular modem 316 may have an integrated router functionality, e.g., as part of the chipset of the cellular modem.

Cellular modem 316 is also depicted as having an IFL IC 319 that may enable cellular modem 316 to communicate with indoor unit 200, either over IFL 150, or a separate IFL. In some implementations, IFL IC 319 is communicatively coupled to IFL IC 340.

The cellular modem 316 may be connected to the satellite modem 370. For example, the two modems may be connected through a board to board connection internal to a chassis of IP Radio 300. Alternatively, the components of the two modems may be implemented on the same board or integrated circuit that may include a shared or split IFL IC for communicating over IFL 150 or multiple IFLs.

In the example, terminal 5's SIM card 223 (and its associated SIM card slot) is retained in indoor unit 200, providing for ease of insertion for replacement of the SIM card 223 when needed. In such implementations, the SIM card 223 may directly couple to a WIFI router or network adapter of indoor unit 200. Any information that needs to be transferred between SIM card 223 and cellular modem 316 may be sent over IFL 150 or some other suitable link between indoor unit 200 and IP Radio 300.

Figure 4:
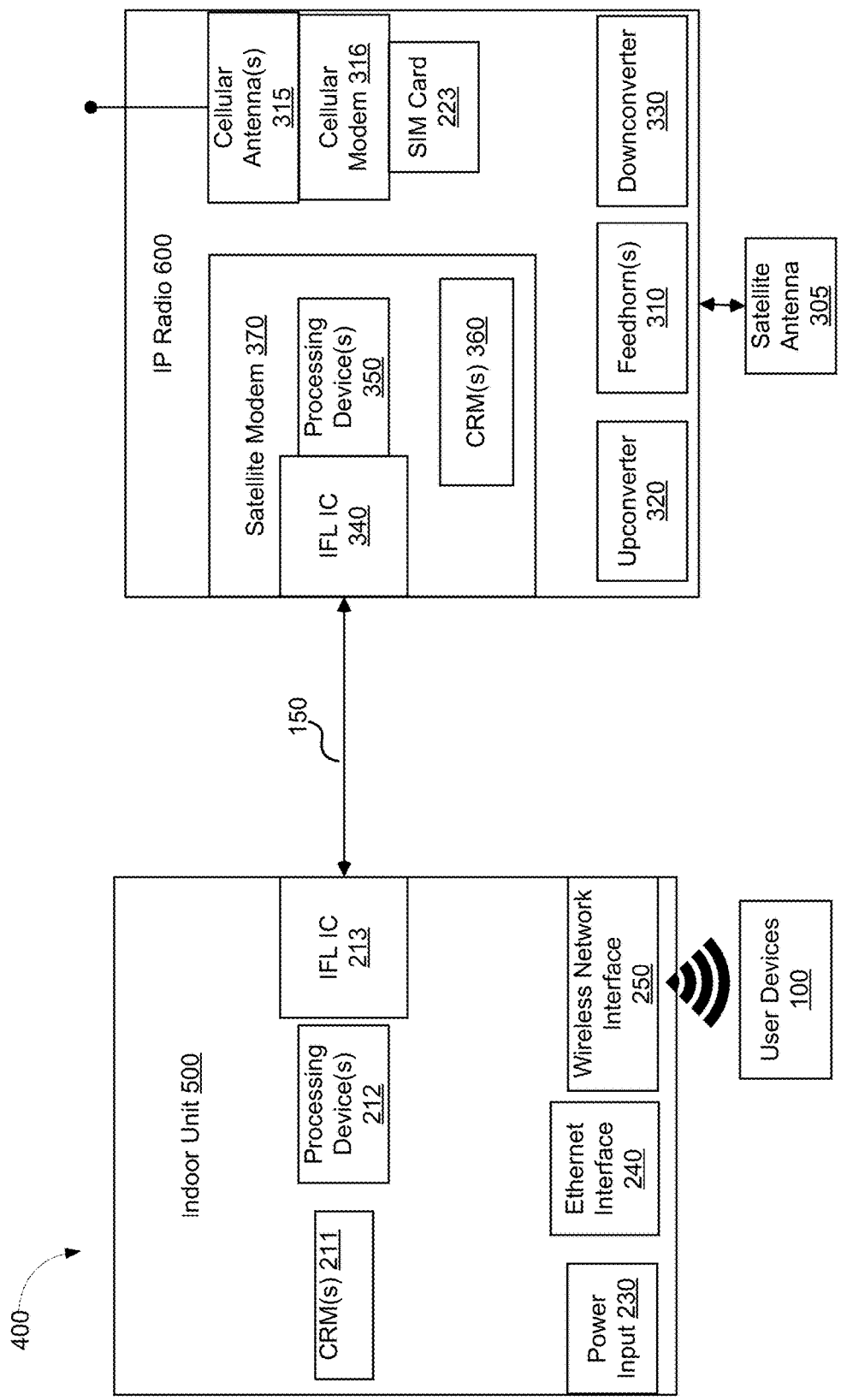
FIG. 4 is a block diagram illustrating some components of an indoor unit and outdoor IP Radio, in accordance with implementations of the disclosure.

In alternative implementations, SIM card 223 may be co-located with cellular modem 316 in IP Radio 300. FIG. 4 is a block diagram illustrating this example with a terminal 400 including indoor unit 500 and IP Radio 600. As depicted, the SIM card 223 may be inserted in a slot of the cellular modem of IP Radio 600. This alternative design obviates the need to include a SIM card slot in indoor unit 500 and communication between the SIM card and cellular modem over an IFL.

Although embodiments of the disclosure have thus far been described in the context of a terminal including an outdoor unit with an IP Radio that includes a satellite modem, it is contemplated that embodiments may also be implemented in terminals where the outdoor unit only includes a Radio or does not include a satellite modem. In such embodiments, the satellite modem may instead be integrated into the indoor unit. The satellite modem in such embodiments may incorporate IFL IC 213, enabling transmission and receipt of data signals over IFL 150 to/from components of the Radio. The outdoor Radio in such embodiments may include feedhorn(s) 310 in communication with satellite antenna 305, upconverter 320, and downconverter 330 that function in a manner similar to that previously discussed.

Additionally, it is contemplated that in some embodiments the cellular modem may be incorporated in the indoor unit while the cellular antenna(s) are incorporated in the outdoor unit. In such implementations, the cellular modem may include IFL IC 213, enabling transmission and receipt of data signals over IFL 150. In implementations where both the satellite modem and cellular modem are incorporated in the indoor unit, the two modems may be connected through a board to board connection internal to a chassis of the indoor unit. Alternatively, the components of the two modems may be implemented on the same board or integrated circuit that may include a shared or split IFL IC for communicating over IFL 150 or multiple IFLs.

Figure 5:
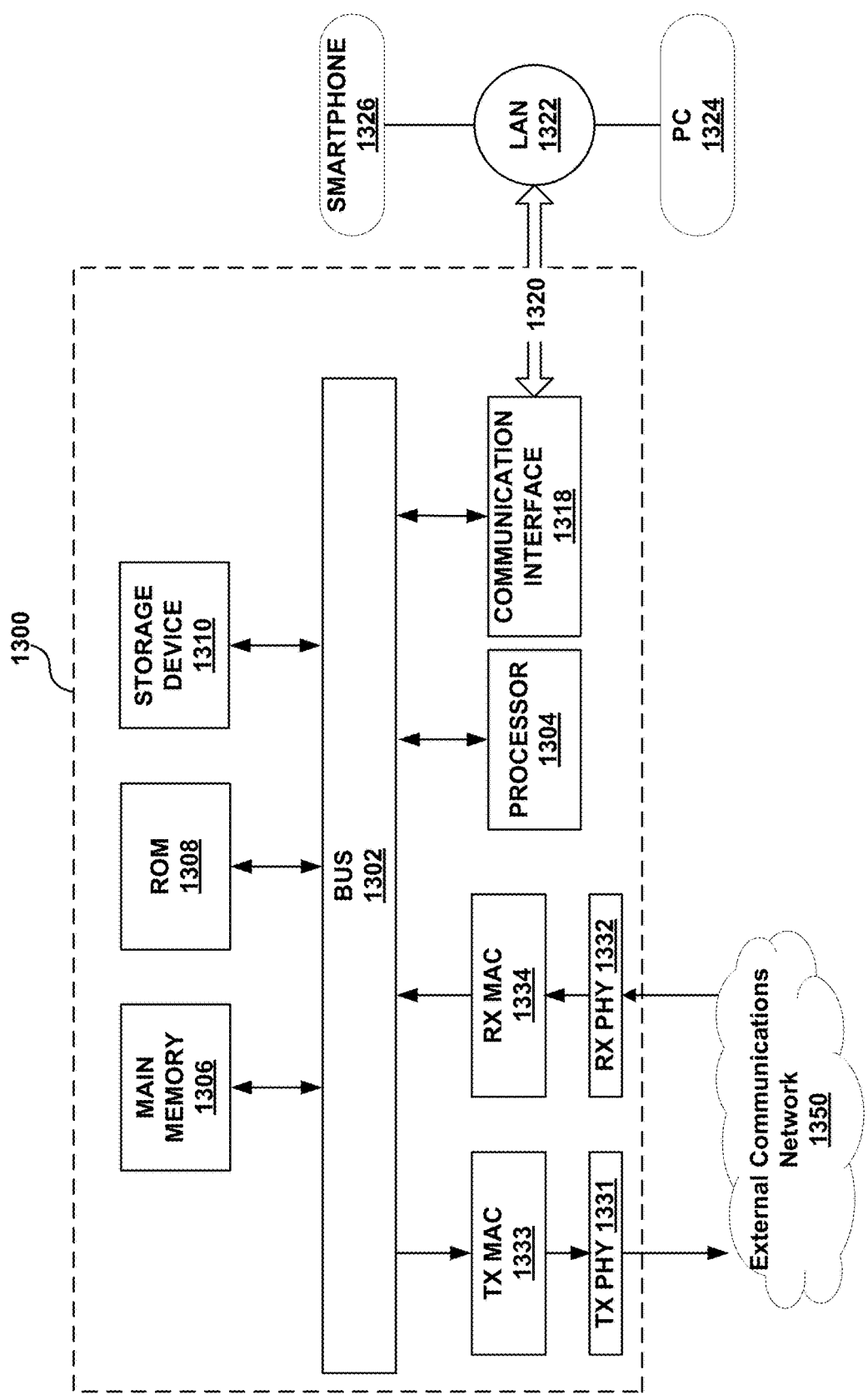
FIG. 5 illustrates a computer system/communication device upon which example embodiments according to the present disclosure can be implemented.

FIG. 5 illustrates a computer system/communication device 1300 upon which example embodiments according to the present disclosure can be implemented. Computer system 1300 can include a bus 1302 or other communication mechanism for communicating information, and a processor 1304 coupled to bus 1302 for processing information. Computer system 1300 may also include main memory 1306, such as a random access memory (RAM) or other dynamic storage device, coupled to bus 1302 for storing information and instructions to be executed by processor 1304. Main memory 1306 can also be used for storing temporary variables or other intermediate information during execution of instructions to be executed by processor 1304. Computer system 1300 may further include a read only memory (ROM) 1308 or other static storage device coupled to bus 1302 for storing static information and instructions for processor 1304. A storage device 1310, such as a magnetic disk or optical disk, may additionally be coupled to bus 1302 for storing information and instructions.

One or more embodiments of the present disclosure may be provided by computer system 1300 in response to processor 1304 executing an arrangement of instructions contained in main memory 1306. Such instructions can be read into main memory 1306 from another computer-readable medium, such as storage device 1310. Execution of the arrangement of instructions contained in main memory 1306 causes processor 1304 to perform one or more processes described herein. One or more processors in a multi-processing arrangement may also be employed to execute the instructions contained in main memory 1306. In alternative embodiments, hard-wired circuitry is used in place of or in combination with software instructions to implement various embodiments. Thus, embodiments described in the present disclosure are not limited to any specific combination of hardware circuitry and software.

Computer system 1300 may also include a communication interface 1318 coupled to bus 1302. Communication interface 1318 can provide a two-way data communication coupling to a network link 1320 connected to a local network 1322. Wired and/or wireless links may be implemented. In any such implementation, communication interface 1318 sends and receives electrical, electromagnetic, or optical signals that carry digital data streams representing various types of information.

Network link 1320 may provide data communication through one or more networks to other data devices. By way of example, network link 1320 can provide a connection through local area network 1322 to network devices, for example including a host computer (PC) 1324, a smartphone 1326, and the like. Local area network 1322 may both use electrical, electromagnetic, or optical signals to convey information and instructions. The signals through the various networks and the signals on network link 1320 and through communication interface 1318, which communicate digital data with computer system 1300, are example forms of carrier waves bearing the information and instructions.

Computer system 1300 may send messages and receive data, including program code, through the network(s), network link 1320, and communication interface 1318. In the Internet example, a server (not shown) might transmit requested code belonging to an application program for implementing an embodiment of the present disclosure through local network 1322 and communication interface 1318. Processor 1304 executes the transmitted code while being received and/or store the code in storage device 1310, or other non-volatile storage for later execution. In this manner, computer system 1300 obtains application code in the form of a carrier wave.

Computer system 1300 includes equipment for communication with an external communications network. In particular, the computer system 1300 may include a transmit-side physical-layer device (TX PHY) 1331, a receive-side physical-layer device (RX PHY) 1332, a transmit-side media access controller (TX MAC) 1333, and a receive-side media access controller (RX MAC) 1334. Transmit packets may be provided to the TX MAC 1333 and TX PHY 1331, which provide corresponding signals to the external communications network 1350. For example, in a satellite communications network, TX MAC may be a TX satellite link controller (SLC), and TX PHY 1331 may provide corresponding signals to a satellite using a terrestrial antenna/dish. Signals received from an external communications network 1350 may be received via RX PHY 1332 and RX MAC 1334, from which receive packets may be obtained.

Figure 6:
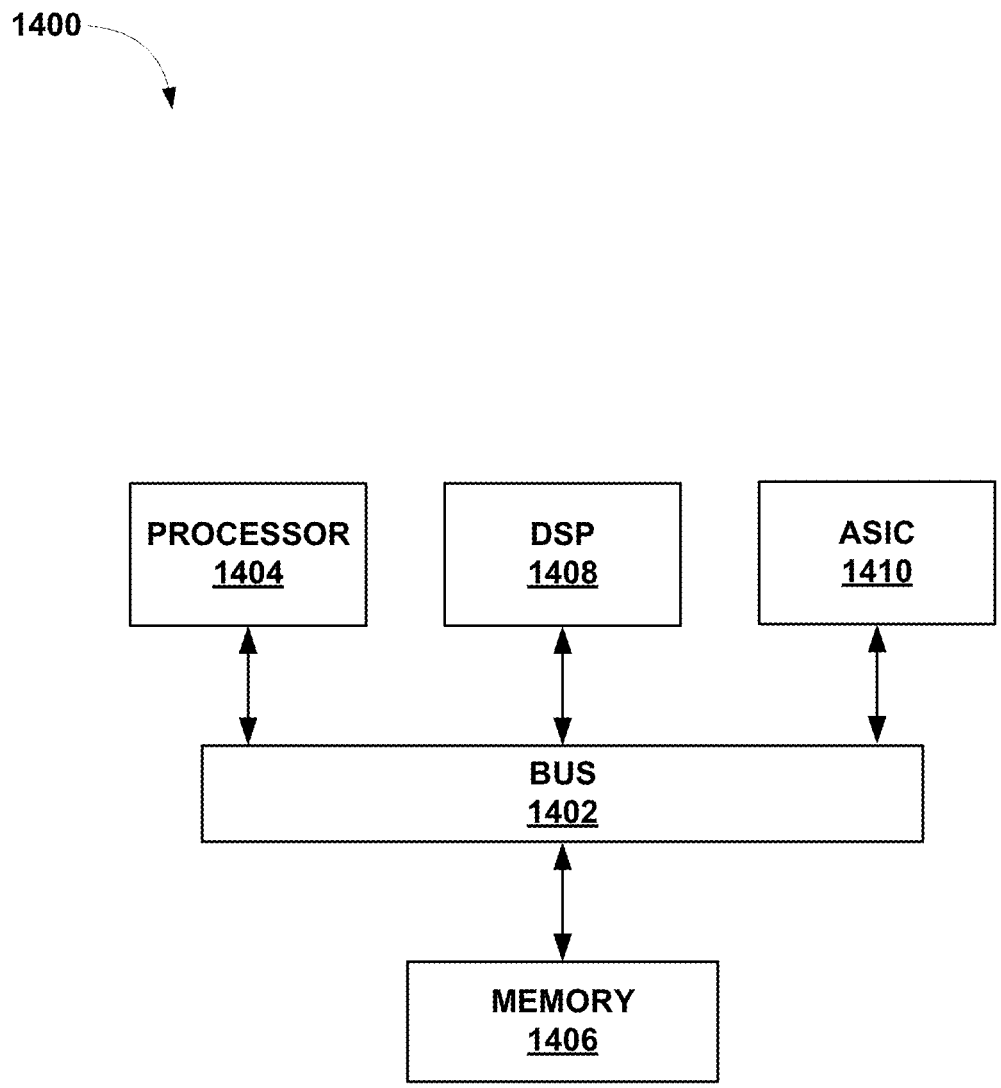
FIG. 6 illustrates a chip set in which embodiments of the disclosure may be implemented.

FIG. 6 illustrates a chip set 1400 in which embodiments of the disclosure may be implemented. Chip set 1400 can include, for instance, processor and memory components described with respect to FIG. 2, FIG. 4, or FIG. 5 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1400 includes a communication mechanism such as a bus 1002 for passing information among the components of the chip set 1400. A processor 1404 has connectivity to bus 1402 to execute instructions and process information stored in a memory 1406. Processor 1404 includes one or more processing cores with each core configured to perform independently. A multi-core processor enables multiprocessing within a single physical package. Examples of a multi-core processor include two, four, eight, or greater numbers of processing cores. Alternatively or in addition, processor 1404 includes one or more microprocessors configured in tandem via bus 1402 to enable independent execution of instructions, pipelining, and multithreading. Processor 1404 may also be accompanied with one or more specialized components to perform certain processing functions and tasks such as one or more digital signal processors (DSP) 1408, and/or one or more application-specific integrated circuits (ASIC) 1410. DSP 1408 can typically be configured to process real-world signals (e.g., sound) in real time independently of processor 1404. Similarly, ASIC 1410 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1404 and accompanying components have connectivity to the memory 1406 via bus 1402. Memory 1406 includes both dynamic memory (e.g., RAM) and static memory (e.g., ROM) for storing executable instructions that, when executed by processor 1404, DSP 1408, and/or ASIC 1410, perform the process of example embodiments as described herein. Memory 1406 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code."Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A combined satellite and cellular very small aperture terminal (VSAT), comprising:
an indoor unit; and
an outdoor unit, comprising:
a satellite antenna; and
an outdoor Internet Protocol (IP) Radio enabling both satellite and cellular communications, the outdoor IP Radio configured to communicatively couple to the indoor unit, and the outdoor IP Radio comprising:
an outdoor cellular antenna configured to communicate over a cellular communications network by transmitting signals generated using at least a cellular modem, the outdoor cellular antenna externally mounted to the outdoor IP Radio;
a feed horn configured to communicatively couple to the satellite antenna, wherein the satellite antenna is configured to communicate over a satellite communications network by transmitting signals over an inroute and receiving signals over an outroute; and
a satellite modem configured to modulate signals for transmission over the inroute.

2. The combined satellite and cellular VSAT of claim 1, wherein the outdoor IP Radio further comprises: the cellular modem.

3. The combined satellite and cellular VSAT of claim 2, wherein the indoor unit comprises: a SIM card slot configured to receive a SIM card.

4. The combined satellite and cellular VSAT of claim 3, wherein the SIM card, when inserted into the SIM card slot, is configured to communicate with the cellular modem over a communication link that communicatively couples the indoor unit and the outdoor IP Radio.

5. The combined satellite and cellular VSAT of claim 2, wherein the outdoor IP Radio further comprises: a SIM card slot configured to receive a SIM card that communicatively couples to the cellular modem.

6. The combined satellite and cellular VSAT of claim 1, wherein the indoor unit comprises: the cellular modem.

7. The combined satellite and cellular VSAT of claim 6, wherein the indoor unit further comprises: a SIM card slot configured to receive a SIM card that communicatively couples to the cellular modem.

8. The combined satellite and cellular VSAT of claim 7, wherein the indoor unit and the outdoor IP Radio are configured to communicatively couple via an interfacility link (IFL) cable.

9. The combined satellite and cellular VSAT of claim 8, wherein the cellular modem is configured to send and receive intermediate frequency (IF) signals over the IFL cable.

10. An outdoor unit for a combined satellite and cellular very small aperture terminal (VSAT), the outdoor unit comprising:
    an outdoor Internet Protocol (IP) Radio enabling both satellite and cellular communications, the outdoor IP Radio configured to communicatively couple to an indoor unit of the combined satellite and cellular VSAT, and the outdoor IP Radio comprising:
        an outdoor cellular antenna configured to communicate over a cellular communications network by transmitting signals generated using at least a cellular modem, the outdoor cellular antenna externally mounted to the outdoor IP Radio;
        a feed horn configured to communicatively couple to a satellite antenna; and
        a satellite modem configured to modulate signals for transmission over an inroute; and
    the satellite antenna, wherein the satellite antenna is configured to communicate over a satellite communications network by transmitting signals over the inroute and receiving signals over an outroute.

11. The outdoor unit of claim 10, wherein the outdoor IP Radio further comprises: the cellular modem.

12. The outdoor unit of claim 11, wherein the indoor unit comprises a SIM card slot for receiving a SIM card, wherein when the SIM card is inserted into the SIM card slot, the cellular modem is configured to communicate with the SIM card over a communication link that communicatively couples the indoor unit and the outdoor unit.

13. The outdoor unit of claim 11, wherein the outdoor IP Radio comprises a SIM card slot for receiving a SIM card that communicatively couples to the cellular modem.

14. The outdoor unit of claim 10, wherein the outdoor IP Radio further comprises: an interfacility link (IFL) interface, wherein the IFL interface is configured to receive an IFL cable that couples the outdoor unit to the indoor unit.

15. The outdoor unit of claim 14, wherein the indoor unit comprises the cellular modem, wherein the outdoor IP Radio is configured to receive intermediate frequency (IF) signals transmitted by the cellular modem over the IFL cable.

16. An indoor unit for a combined satellite and cellular very small aperture terminal (VSAT), the indoor unit comprising:
    a network interface configured to connect one or more user devices over a local area network; and
    a SIM card slot configured to receive a SIM card, wherein the indoor unit is configured to communicatively couple, over an interfacility link (IFL) connecting the indoor unit to an outdoor Internet Protocol (IP) Radio of the combined satellite and cellular VSAT, the SIM card to a cellular modem of the outdoor IP Radio that generates a signal used during transmission by an outdoor cellular antenna.

* * * * *